United States Patent Office 3,492,327
Patented Jan. 27, 1970

3,492,327
PROCESS FOR PREPARING ORGANOTIN
ALKOXIDES AND PHENOXIDES
Alwyn George Davies, Pinner, England, assignor to
M & T Chemicals Inc., New York, N.Y., a corporation of Delaware
No Drawing. Filed Feb. 9, 1967, Ser. No. 614,790
Int. Cl. C07f 7/22
U.S. Cl. 260—429.7                                      8 Claims

ABSTRACT OF THE DISCLOSURE

A process for preparing organotin alkoxides and phenoxides by reaction of organotin oxides or-hydroxides carbonates. The said organotin compounds are useful as fungicides, biocides, or as catalyst in esterification or polymerization reactions.

---

This invention relates to a novel process for preparing organotin alkoxides.

As is well known to those skilled-in-the-art, organotin alkoxides have heretofore been used in a wide variety of processes, and, in fact, they have shown considerable promise as highly useful reagents in organic synthesis. However, their use has been substantially limited because there has heretofore been no completely satisfactory process for conveniently obtaining these compounds in high yield at minimum expense.

It is an object of this invention to provide a novel process for preparing organotin alkoxides. Other objects will be apparent to those skilled-in-the-art from the following description.

In accordance with certain of its aspects, the process of this invention for preparing an organotin alkoxide may comprise reacting an organotin oxide with R'O—CO—OR' wherein R' is a hydrocarbon radical selected from the group consisting of alkyl, cycloalkyl, alkaryl, aryl, heterocyclic and aralkyl thereby forming a reaction mixture; heating said reaction mixture thereby liberating carbon dioxide and forming an organotin alkoxide; and recovering said organotin alkoxide from said reaction mixture.

The organotin oxides which may be employed in practice of this invention may be those having the formula $(R_3Sn)_2O$. An organotin oxide of formula $R_2SnO$ may also be used when reacted with ethylene carbonate. Most organotin hydroxides are unstable and tend to revert to the corresponding oxide, but stable organotin hydroxides, such for example as compounds of the formula $R_3SnOH$, where R is methyl, ethyl or phenyl, may be used in place of the corresponding oxide.

In the organotin oxide R may be a hydrocarbon radical preferably selected from the group consisting of alkyl, alkenyl, alkynyl, cycloalkyl, aralkyl, aryl, alkaryl and heterocyclic, including such radicals when inertly substituted. When R is alkyl, it may typically be straight chain alkyl or branched alkyl, including methyl, ethyl, n-propyl, isopropyl, n-butyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl i.e. having less than about 8 carbon atoms i.e. octyls and lower. When R is alkenyl, it may typically be vinyl, allyl, 1-propenyl, methallyl, buten-1-yl, buten-2-yl, buten-3-yl, penten-1-yl, hexenyl, heptenyl, octenyl, decenyl, dodecenyl, tetradecenyl, octadecenyl, etc. When R is alkynyl, it may typically be ethynyl, propynyl, phenylethylnyl, etc. When R is cycloalkyl, it may typically be cyclopentyl, cyclohexyl, cycloheptyl, cyclooctyl, etc. When R is aralkyl, it may typically be benzyl, β-phenylethyl, γ-phenylpropyl, β-phenylpropyl, etc. When R is aryl, it may typically be phenyl, naphthyl, etc. When R is alkaryl, it may typically be tolyl, xylyl, p-ethylphenyl, p-nonylphenyl, etc. When R is heterocyclic it may typically be pyridyl, quinolinyl, furfuryl, thiophenyl, etc. R may be inertly substituted e.g. may bear a non-reactive substituent such as alkyl, aryl, cycloalkyl, aralkyl, alkaryl, alkenyl, ether, halogen, nitro, etc. Typical substituted alkyls include 3-chloropropyl, 2-ethoxyethyl, carboethoxymethyl, etc. Substituted alkenyls include 4-chlorobutenyl, γ-phenylpropenyl, chloroallyl, etc. Substituted cycloalkyls include 4-methylcyclohexyl, 4-chlorocyclohexyl, etc. Inertly substituted aryl includes chlorophenyl, anisyl, biphenyl, etc. Inertly substituted aralkyl includes chlorobenzyl, p-phenylbenzyl, p-methylbenzyl, etc. Inertly substituted alkaryl includes 3-chloro-5-methylphenyl, 2,6-di-tert-butyl-4-chlorophenyl, etc.

Typical compounds which may be employed may include the following:

bis(tri-n-butyl tin) oxide
bis(tri-n-propyl tin) oxide
bis(tri-n-amyl tin) oxide
bis(tri-n-octyl tin) oxide
bis(tri-phenyltin) oxide
di-n-butyl tin oxide
dimethyl tin oxide
di-cyclohexyl tin oxide
di-phenyltin oxide The preferred compound may be bis(tri-n-butyl tin) oxide.

These compounds may be readily available commercially or may be prepared from $R_3SnX$, e.g. $R_3SnCl$, by hydrolysis with a base such as aqueous caustic soda to form $(R_3Sn)_2O$ or by the hydrolysis of $R_2SnX_2$ to form $R_2SnO$.

The hydrocarbon carbonates R'O—CO—OR' which may be used in the process of this invention may be compounds wherein the R' groups, which may be the same or different and may be linked, may be selected from the same group of substituents, except for alkenyl and alkynyl, as R supra. Typical compounds R'O—CO—OR' which may be employed may be the following:

di-methyl carbonate
di-ethyl carbonate
ethylene carbonate, i.e.

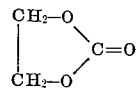

di-trichloroethyl carbonate
methyl propyl carbonate
methyl phenyl carbonate
di-propyl carbonate
di-butyl carbonate
di-isobutyl carbonate
di-phenyl carbonate
di-ethyl pyrocarbonate, i.e.

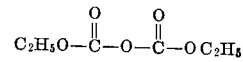

The preferred compound which may be employed may be di-methyl carbonate. These carbonates may be prepared by reacting carbonyl chloride with the appropriate alcohol.

The novel process of this invention may be carried out by reacting the organotin oxide or hydroxide with the carbonate. Preferably, one mole of the oxide may be added to a reaction vessel and 0.9–1.1 moles, preferably 1 mole, of the carbonate may thereafter be added to the reaction vessel which is fitted with a distillation column suitable for refluxing. The reaction mixture may then be heated to temperature of 70° C.–150° C., and preferably to reflux temperature which may be 120° C.–130° C. Refluxing may be continued for 15 minutes to 2 hours, typically 1 hour, during which period carbon dioxide gas may be evolved as the organotin carbonate decomposes. The typical reaction may be in accordance with the following reactions:

$$(R_3Sn)_2O + R'O\text{---}CO\text{---}OR' \rightarrow$$
$$R_3SnOR' + [R_3SnOCOOR'] \quad (1)$$
$$R_3SnOCOOR' \rightarrow R_3SnOR' + CO_2 \quad (2)$$

Typically, the reaction may be, when using the preferred compounds:

$$(Bu_3Sn)_2O + MeO\text{---}CO\text{---}OMe \rightarrow$$
$$Bu_3SnOMe + [Bu_3SnOCOOMe] \quad (3)$$
$$[Bu_3SnOCOOMe] \rightarrow Bu_3SnOMe + CO_2 \quad (4)$$

When the organotin oxide is $R_2SnO$, the reactions may be:

$$R_2SnO + R'O\text{---}CO\text{---}OR' \rightarrow R_2Sn(OR')_2$$
$$+ [R_2Sn(OCOOR')_2] \quad (5)$$
$$[R_2Sn(OCOOR')_2] \rightarrow R_2Sn(OR')_2 + 2CO_2 \quad (6)$$

or specifically $$2Bu_2SnO + 2 \begin{array}{c} CH_2\text{-}O \\ | \\ CH_2\text{-}O \end{array}\!\!\!\!\!\!\!\!C=O \longrightarrow [Bu_2Sn\text{-}O\text{-}CH_2\text{-}CH_2\text{-}O]_2 + 2CO_2 \quad (7)$$

At the conclusion of the reaction, the desired organotin alkoxide may be distilled at pressure of 0.01–760 mm. Hg, typically 0.1–0.4 mm. Hg to yield a product having a boiling point which may be, for example, 75° C.–200° C. at pressure of distillation. The desired product may typically be achieved in yields of greater than about 85% and commonly approaching the stoichiometric. The compounds formed, typically, tributyltin methoxide, may be useful per se as fungicides or for other biocidal uses. These compounds may also possess catalytic activity in esterification or polymerization reactions. They may alternatively be employed as intermediates in formation of other organotin compounds.

Practice of this invention may be readily observed from the following illustrative examples, wherein all parts are in parts per weight unless specifically mentioned.

EXAMPLE 1

59 parts by weight (1 mole) of bistributyltin oxide and 15 parts by weight (1 mole) of dipropyl carbonate were added to a reaction vessel bearing a reflux condenser. The reaction mixture was heated, with agitation, to reflux temperature of 140° C. where it was maintained for 1 hour. As refluxing proceeds carbon dioxide gas is evolved. The system was then fitted for vacuum distillation and the product tributyltin propoxide was distilled at 122° C. and 0.4 mm. Hg. The product obtained in a yield of 84% was analyzed and found to contain 50.5% C (51.6%) and 9.7% H (9.8%). The product was a mobile free-flowing liquid.

EXAMPLES 2–11

These examples are set forth in the following table. The named reactants were used in the amounts stated in parts by weight (PBW) and the procedure of Example 1 was followed, the reaction time and temperature being varied as stated. In Example 4 no heating was necessary prior to vacuum distillation. In Examples 2–9 the product was a liquid of the boiling point stated. The products of Examples 10 and 11 were solids. The reactants were liquids except in the case of Example 10, in which the oxide used was solid, and Example 11 in which both reactants were solid and were mixed in 35 parts by weight of toluene. In this example, the toluene was removed by evaporation after completion of the reaction and the product recrystallized from benzene.

TABLE

| Example | P.b.w. | Oxide | P.b.w. | Moles | Carbonate | Temp.,° | Time (hr.) | Product | B.P. | Yield, Percent | Found (calc.) |
|---|---|---|---|---|---|---|---|---|---|---|---|
| 2 | 59 | Bistributyltin oxide | 17 | 1 | Di-n-butyl carbonate | 140 | 1.5 | Tributyltin butoxide | 116°/0.1 mm. | 69 | 52.0% C (52.9) 9.4% H (10.0). |
| 3 | 59 | do | 17 | 1 | Di-isobutyl carbonate | 140 | 1.5 | Tributyltin isobutoxide | 110°/0.1 mm. | 78 | 49.9% C (50.1) 9.6% H (9.6). |
| 4 | 59.7 | do | 16.5 | 1 | Diethyl pyrocarbonate | | | Tributyltin ethoxide | 110°/1 mm. | ca. 90 | |
| 5 | 59 | do | 21.4 | 1 | Diphenyl carbonate | 90–100 | 1.25 | Tributyltin phenoxide | 130°/0.05 mm. | 97 | |
| 6 | 135 | do | 18.3 | 1 | Ethylene carbonate | 130–135 | 2 | 1,2-bis(tributyl stannyloxy)ethane | 170°/0.1 mm. | 96 | 48.6% C (48.7) 9.2% H (9.1). |
| 7 | 59 | do | 15 | 1.5 | Dimethyl carbonate | 130–135 | 0.65 | Tributyltin methoxide | 90°/0.1 mm. | 93 | |
| 8 | 60 | Bistrioctyltin oxide | 18 | 1.5 | Diethyl carbonate | 130–135 | 1 | Trioctyltin ethoxide | 92°/0.1 mm. | 100 | |
| 9 | 93 | Bistriphenyltin oxide | 13.5 | 1.5 | Dimethyl carbonate | 125–130 | 0.75 | Triphenyltin methoxide | 160°/0.1 mm. | 86 | 62.2% C (61.3) 11.2% H (11.1). |
| 10 | 17 | do | 0.5 | 1 | Diphenyl carbonate | 120 | 2 | Triphenyltin phenoxide | M.P. 82–84° (solid) | 95 | |
| 11 | 99 | Dibutyltin oxide | 35 | 1 | Ethylene carbonate | (¹) | 2.25 | $(Bu_2SnO\cdot CH_2CH_2O)_2$ | M.P. 218–224° (205–210° crude) | ² 100 | |

Although this invention has been illustrated by reference to specific examples, numerous changes and modifications thereof which clearly fall within the scope of the invention will be apparent to those skilled-in-the-art.

What I claim as my invention and desire to secure by Letters Patent is:

1. The process for preparing organotin alkoxides and phenoxides which comprises reacting an organotin oxide or hydroxide with R'O—CO—OR' wherein the R' groups which may be the same or different and may be linked, are organic radicals selected from the group consisting of alkyl, cycloalkyl, alkaryl, aryl, aralkyl and heterocyclic thereby forming a reaction mixture; heating said reaction mixture thereby liberating carbon dioxide and forming said organotin alkoxides and phenoxides; and recovering said organotin alkoxides and phenoxides from said reaction mixture.

2. The process as claimed in claim 1 wherein said organotin oxide is of the formula $(R_3Sn)_2O$ and R is an organic radical selected from the same group as that from which R' is selected, or an alkenyl or alkynyl radical.

3. The process as claimed in claim 2 wherein said organotin oxide is bis(tri-n-butyltin) oxide.

4. The process as claimed in claim 2 wherein said organotin oxide is of the formula $R_2SnO$, and the carbonate is ethylene carbonate.

5. The process as claimed in claim 4 wherein said organotin oxide is dibutyltin oxide.

6. The process as claimed in claim 1 wherein said compound R'O—CO—OR' is di-methyl carbonate.

7. The process as claimed in claim 1 wherein said reaction mixture is heated and maintained at reflux temperature during liberation of carbon dioxide.

8. The process for preparing tri-butyltin methoxide which comprises reacting bis(tri-n-butyltin) oxide with di-methyl carbonate thereby forming a reaction mixture; heating said reaction mixture thereby liberating carbon dioxide and forming tri-butyltin methoxide; and recovering said organotin methoxide from said reaction mixture.

References Cited

UNITED STATES PATENTS 2,700,675   1/1955   Mack et al. _____ 260—429.7

DELBERT E. GANTZ, Primary Examiner

W. F. W. BELLAMY, Assistant Examiner